US012613492B2

(12) United States Patent
Bando

(10) Patent No.: US 12,613,492 B2
(45) Date of Patent: Apr. 28, 2026

(54) IMAGE FORMING APPARATUS

(71) Applicant: CANON KABUSHIKI KAISHA, Tokyo (JP)

(72) Inventor: Yoshimasa Bando, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/010,710

(22) Filed: Jan. 6, 2025

(65) Prior Publication Data

US 2025/0258461 A1 Aug. 14, 2025

(30) Foreign Application Priority Data

Feb. 13, 2024 (JP) ................................ 2024-019187

(51) Int. Cl.

*G03G 21/20* (2006.01)
*G03G 15/00* (2006.01)
*G03G 15/20* (2006.01)
*G03G 21/00* (2006.01)
*G03G 21/16* (2006.01)

(52) U.S. Cl.

CPC ......... *G03G 21/206* (2013.01); *G03G 15/657* (2013.01); *G03G 21/0052* (2013.01); *G03G 21/1623* (2013.01); *G03G 21/1628* (2013.01); *G03G 21/1633* (2013.01); *G03G 21/1638* (2013.01); *G03G 21/20* (2013.01); *G03G 15/2064* (2013.01); *G03G 2221/0015* (2013.01); *G03G 2221/0094* (2013.01); *G03G 2221/1645* (2013.01); *G03G 2221/1687* (2013.01); *G03G 2221/169* (2013.01)

(58) Field of Classification Search

CPC ............ G03G 15/657; G03G 15/2064; G03G 21/0052; G03G 21/1623; G03G 21/1628; G03G 21/1633; G03G 21/1638; G03G 21/20; G03G 21/206; G03G 2221/0015; G03G 2221/0094; G03G 2221/1645; G03G 2221/1687; G03G 2221/169

See application file for complete search history.

(56) References Cited

U.S. PATENT DOCUMENTS

2018/0101133 A1* 4/2018 Oya .................. G03G 15/2017
2019/0332053 A1* 10/2019 Kawasumi ........... G03G 21/206

FOREIGN PATENT DOCUMENTS

JP 2019164193 A 9/2019

* cited by examiner

*Primary Examiner* — Joseph S Wong
(74) *Attorney, Agent, or Firm* — ROSSI, KIMMS & McDOWELL LLP

(57) ABSTRACT

Disclosed is an image forming apparatus including: a door configured to open a conveying path between a transfer portion for forming a toner image on a recording material and a fixing portion for fixing the toner image, the door facing a surface of the recording material traveling through the conveying path; a duct provided on the door, the duct having an intake inlet and an exhaust outlet; a fan provided inside the duct, which generates the air flow travelling from the intake inlet to the exhaust outlet; and a filter provided detachably attachable to the duct, which collects particles with a predetermined particle diameter, wherein the filter has a width that is equal to or greater than an image width of a recording material with a maximum width passing through a fixing nip portion in a widthwise direction perpendicular to a conveying direction of the recording material.

10 Claims, 7 Drawing Sheets

IMAGE FORMING APPARATUS

BACKGROUND OF THE INVENTION

Field of the Invention

This invention relates to an image forming apparatus provided with a fixing portion that fixes an image on a recording material.

Description of the Related Art

In an image forming apparatus using the electrophotographic system, a recording material bearing a toner image is heated and pressurized at the nip portion of the fixing portion to fix the toner image onto the recording material. It is known that fine particles with a diameter less than 100 [nm] such as Volatile Organic Compounds (VOC) and Ultra Fine Particles (UFP) are discharged by the heating of the fixing process.

Japanese Patent Application Laid-open No. 2019-164193 discloses the configuration for reducing these fine particles. The configuration disclosed in this document includes an exhaust duct disposed in the vicinity of the fixing nip portion that takes in air and exhausts the air outside the apparatus, a fan disposed in an exhaust path of the exhaust duct, and a filter disposed between the fan and the exhaust outlet in a path of the exhaust duct for collecting UFP. When the fan exhausts the air outside the apparatus, UFP contained in the exhausted air are collected by the filter during the air passing through the filter.

SUMMARY OF THE INVENTION

A representative configuration of the present invention is an image forming apparatus for forming an image on a recording material, comprising:

- a transfer portion configured to form a toner image on the recording material using toner containing release agent;
- a fixing portion configured to fix the toner image formed on the recording material by the transfer portion by nipping and conveying the recording material at a fixing nip portion formed with a pair of rotating members;
- a door configured to open a conveying path between the transfer portion and the fixing portion, the door being opposed to a surface of the recording material traveling through the conveying path;
- a duct provided on the door, the duct having an intake inlet for taking in air and an exhaust outlet for exhausting the air taken in from the intake inlet outside the image forming apparatus, the duct forming a closed space for an air flow travelling from the intake inlet to the exhaust outlet;
- a fan provided inside the duct, the fan being configured to generate the air flow travelling from the intake inlet to the exhaust outlet; and
- a filter provided detachably attachable to the duct, the filter being configured to collect particles with a predetermined particle diameter that are caused by the release agent,
- wherein the filter has a width that is equal to or greater than an image width of a recording material with a maximum width passing through the fixing nip portion in a widthwise direction perpendicular to a conveying direction of the recording material.

Further features of the present invention will become apparent from the following description of exemplary embodiments with reference to the attached drawings.

DESCRIPTION OF THE EMBODIMENTS

Hereinafter, with reference to the drawings, preferred embodiments of the present invention will be exemplarily described in detail. However, the dimensions, materials, shapes and relative positions of the components of the image forming apparatus described in the following embodiments should be varied as appropriate according to the configuration of an apparatus to which the present invention is applied and the various conditions, and the following description is not intended to limit the scope of the invention to them alone.

<Image Forming Apparatus>

Figure 1:
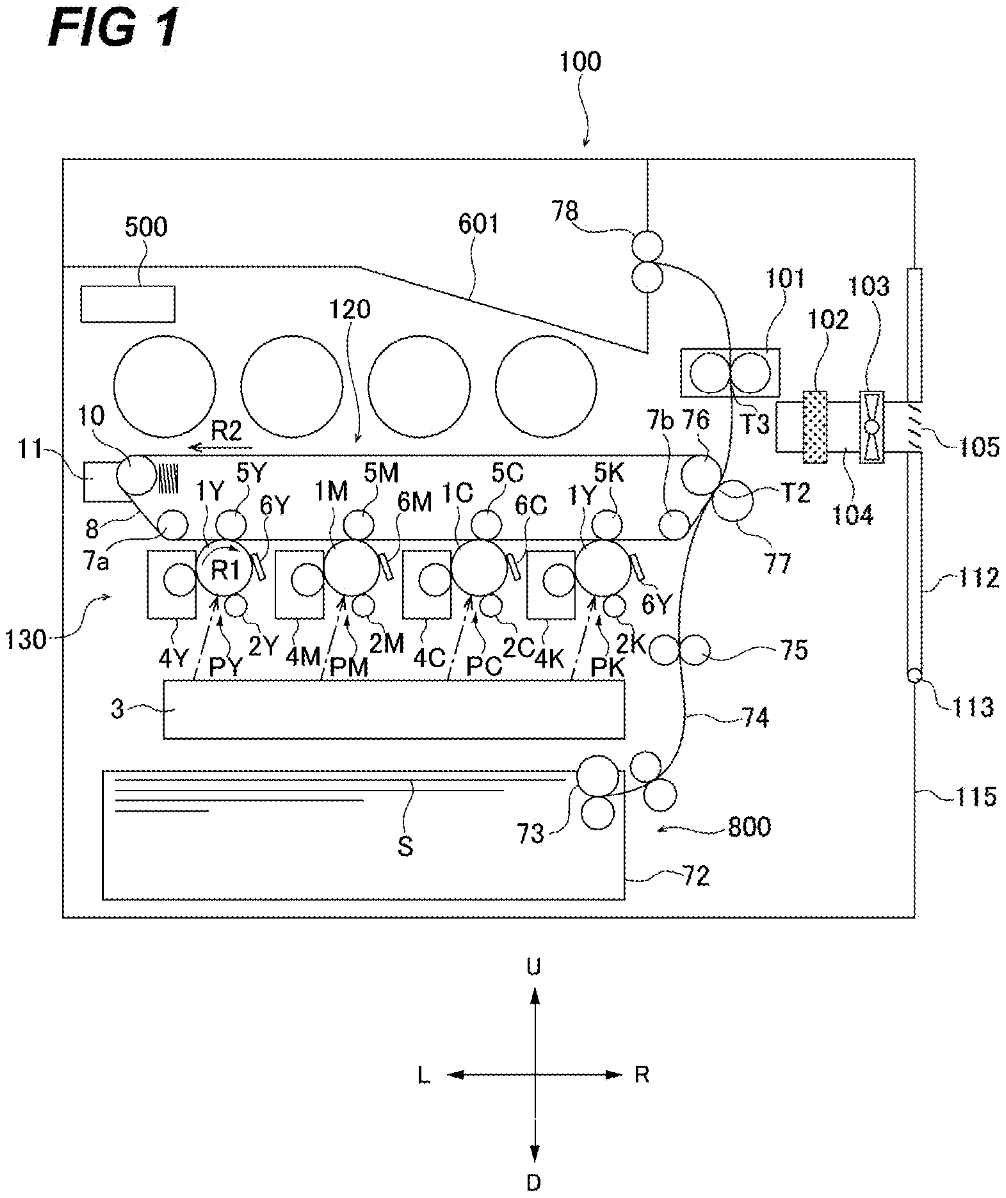
FIG. 1 is a diagram showing a cross-sectional view of an image forming apparatus.

The image forming apparatus according to an embodiment of the present invention will be described with reference to FIG. 1. FIG. 1 is a schematic diagram showing a cross-sectional view of the image forming apparatus of the embodiment.

The image forming apparatus 100 shown in FIG. 1 is a color image forming apparatus of the intermediate transfer tandem system. In the main body of the image forming apparatus 100, the image forming portions PY, PM, PC and PK for four colors (yellow, cyan, magenta and black) are disposed being opposed to the intermediate transfer belt 8. The recoding materials S that can be used for image forming apparatus 100 include various kinds of sheet materials such as plain paper, thick paper, rough paper, emboss paper, coated paper, OHP sheet, plastic film and cloth. The image forming apparatus is controlled by the controller 500.

The image forming apparatus 100 includes the image forming portions PY to PK that form images on the photosensitive drums 1, the intermediate transfer unit 120 with the intermediate transfer belt 8 bearing images formed on the photosensitive drums 1, the sheet feeding portion 800 that feeds the recording material S and the fixing portion 101. The image forming unit 130 for forming an image on the recording material S in the present embodiment is constituted by the image forming portions PY to PK, the primary transfer rollers 5Y to 5K, the intermediate transfer belt 8, the secondary transfer inner roller 76 and the secondary transfer outer roller 77. The intermediate transfer unit 120 is constituted by the intermediate transfer belt 8 that is an endless belt, the tension roller 10 that tensions the intermediate transfer belt 8, the secondary transfer inner roller 76, the idler rollers 7*a* and 7*b*, and so on. The intermediate transfer unit 120 is a transfer portion that transfers the images formed in the image forming portions PY to PK on the recording material S at the transfer nip portion (secondary transfer portion T2). The sheet feeding portion 800 is constituted by the cassette 72, the sheet feeding roller 73, the conveying path 74 and the registration roller 75.

The conveying process of the recording materials S in the image forming apparatus 100 will be described. The recording materials S are accommodated in the cassette 72 such that the recording materials S are stacked. The recording materials S are fed by the sheet feeding roller 73 one by one in synchronism with the image forming operation. The conveying path 74 is formed by guide members that guide the recording materials S. When the recording materials S are conveyed to the registration roller 75 disposed in the middle of the conveying path 74, the skew feeding adjustment and the timing adjustment are performed for the recording materials S by the registration roller 75 and after that the recording materials S are conveyed to the secondary transfer portion T2. The secondary transfer portion T2 is a transfer nip portion formed via the intermediate transfer belt 8 by the secondary transfer inner roller 76 and the secondary transfer outer roller 77 that are opposed to each other. In the secondary transfer portion T2, images are secondarily transferred from the intermediate transfer belt 8 to the recording materials S.

The image forming process of the image conveyed to the secondary transfer portion T2 in synchronism with the conveying process of the recoding material S to the secondary transfer portion T2 will be described. The configurations of the image forming portions PY, PM, PC and PK are substantially the same as each other except for the difference in colors yellow, magenta, cyan and black of toner used in developing devices 4Y, 4M, 4C and 4K. Therefore, in the following description, only the configuration of the image forming portion PY for color yellow will be exemplarily described and those of the other image forming portions PM, PC and PK will be omitted.

The image forming portion PY is mainly constituted by the photosensitive drum 1Y as image bearing member, the charging device 2Y as process portion working on the photosensitive drum 1Y, the developing device 4Y and the photosensitive drum cleaner 6Y. During the image formation, the photosensitive drum 1Y is driven to rotate at a predetermined process speed (circumferential speed) in the direction of arrow R1. A charging voltage is applied to the charging device 2Y by a high voltage power supply (not shown), so that a current flows between the charging device 2Y (charging roller) and the photosensitive drum 1Y. As a result, the surface of the photosensitive drum 1Y is uniformly charged to a predetermined polarity and potential. An electrostatic latent image is formed on the charged photosensitive drum 1Y by the exposure of the exposure device 3 based on the image information. The toner is attached to the electrostatic latent image by the developing device 4Y so that the electrostatic latent image is developed into a toner image. The primary transfer roller 5Y is disposed facing the image forming portion PY via the intermediate transfer belt 8. A predetermined pressure force and a primary transfer voltage are applied to the image formed on the photosensitive drum 1Y so that the image formed on the photosensitive drum 1Y is primarily transferred onto the intermediate transfer belt 8. The toner slightly remaining on the photosensitive drum 1Y after the primary transfer is removed by the photosensitive drum cleaner 6Y to be ready for the next image forming process.

The intermediate transfer belt 8 is tensioned by the tension roller 10, the secondary transfer inner roller 76 and the idler rollers 7*a* and 7*b* as tension rollers and is driven to move in the direction of arrow R2 in the figure. In the present embodiment, the secondary transfer inner roller 76 also works as a driving roller for driving the intermediate transfer belt 8. The image forming processes for the respective colors are performed by the image forming portions PY to PK in synchronism such that each image is superimposed in a sequential manner with an upstream toner image or upstream toner images in the direction of the movement primarily transferred on the intermediate transfer belt 8. As a result, a full color toner image is finally formed on the intermediate transfer belt 8 and this full color toner image is conveyed to the secondary transfer portion T2. The remaining toner after passing the secondary transfer portion T2 is removed from the intermediate transfer belt 8 by the transfer cleaner 11.

By the above described conveying process and image forming process, at the time when the recording material arrives at the secondary transfer portion T2, the toner image is secondarily transferred from the intermediate transfer belt 8 to the recording material S. After that, the recording material S on which the toner image has been transferred is conveyed to the fixing portion 101 disposed above the intermediate transfer unit 120 in the vertical direction through the conveying path 74.

The fixing portion 101 is constituted by the pair of rotating members 114 including the endless belt 107 and the conveying rollers 108. In the fixing portion 101, the recording material bearing a toner image transferred at the intermediate transfer unit 120 is nipped and conveyed at the fixing nip portion T3 formed by the pair of rotating members 114 to fix the toner image. The endless belt 107 is a first rotating member that is heated by the heater 109 to a high temperature and that heats the recording material S bearing an image. The conveying roller 108 is a second rotating member that abuts on the belt 107 to form the fixing nip portion T3. When the recording material S is nipped and conveyed at the fixing nip portion T3, the belt 107 is heated by the heater 109 to a high temperature. As a result, heat and pressure are applied to the recording material S and the toner image is fixed onto the recording material S. Then, the recording material S on which the toner image has been fixed is discharged on the discharge tray 601 by the discharge roller 78.

In the present embodiment, the inlet of the fixing portion 101 (fixing nip portion T3) for the recording material S is disposed more downwardly in the vertical direction than the outlet, so that the recording material S is conveyed from the lower portion to the upper portion in the vertical direction. In the following description, the downstream side of the fixing nip portion T3 in the conveying direction of the recording material S is referred to as downstream side and the upstream side of the fixing nip portion T3 in the conveying direction of the recording material S is referred to as upstream side.

In FIG. 1, the direction from the back surface to the top surface of the drawing sheet is defined as forward direction, and the direction from the top surface to the back surface of the drawing sheet is defined as backward direction. With respect to the image forming apparatus 100, the top side of the drawing sheet shown in FIG. 1 is defined as front side and the side opposite to the top side is defined as back side.

With respect to the photosensitive drum 1K on which an electrostatic latent image for a black toner image is formed, the side on which the photosensitive drum 1Y on which an electrostatic latent image for a yellow toner is formed is disposed is defined as left side. With respect to the photosensitive drum 1Y on which an electrostatic latent image for a yellow toner image is formed, the side on which the photosensitive drum 1K on which an electrostatic latent image for a black toner is formed is disposed is defined as right side. The upward direction in the vertical directions that are perpendicular to the forward/backward directions and the rightward/leftward directions defined above is defined as upward direction. The downward direction in the vertical directions that are perpendicular to the forward/backward directions and the rightward/leftward directions defined above is defined as downward direction. The forward direction F, the backward direction B, the rightward direction R, the leftward direction L, the upward direction U, the downward direction D are shown in FIG. 1 and so on.

<Mechanism of Generation of Fine Particles>

Next, the mechanism of generation of the fine particles due to release agent included in toner will be described. In the following, the fine particles are exemplified as Ultra Fine Particles (UFP) with a diameter of 100 [nm] or less.

As described above, in the fixing portion 101, the recording material S is brought into contact with the belt 107, which is of a high temperature, to fix the toner image. When the fixing process is performed using such a configuration, a part of the toner may be transferred (attached) to the belt during the fixing process. This phenomenon is referred to as offset phenomenon, which causes image defects and is required to be delt with.

In view of this, the toner used in image forming apparatuses generally includes wax as release agent. When the toner is heated, the inside wax is melted to exude. Therefore, when the fixing process is performed for the toner image, the melted wax convers the surface of the belt 107. As a result, it becomes hard for the toner to be attached to the belt 107 whose surface is covered with wax owing to the releasing effect of the wax.

In the present embodiment, compounds including the molecular structure of the wax are also referred to as wax in addition to the pure wax. For example, the compounds resulting from the interaction of the resin molecules and the molecular structure of the wax are referred to as wax. Further, substances having the release effect such as silicon oil instead of wax can be used as release agent.

When the wax is melted, a part of the wax is vaporized. This is considered to be due to the variation in the size of the molecule components of the wax. Namely, the wax includes low-molecular components with short molecular chain and low boiling point and high-molecular components with long molecular chain and high boiling point, and the low-molecular components with low boiling point are considered to be vaporized first.

When the vaporized wax components are cooled in the air, fine particles with a diameter of several nanometers to several hundreds of nanometers are produced. Many of these particles seemingly have a diameter of several nanometers to several tens of nanometers and these particles are the above described UFP.

As described above, UFP is produced due to the heating during the fixing process. Therefore, it is understood that UFP is produced mainly from the fixing nip portion T3 where the heat is applied to the wax. Further, taking into consideration the rotation of the belt 107 and the disposition of the heater 109, the belt 107 becomes of the highest temperature on the upstream side of the fixing nip portion T3. Therefore, it is understood that UFP is produced most at the upstream side of the fixing nip portion T3. Further, UFP is also produced from the toner image transferred onto the recording material S. Therefore, it is understood that UFP is produced in the entire region for image width in the longitudinal direction of the fixing nip portion T3.

Figure 4A:
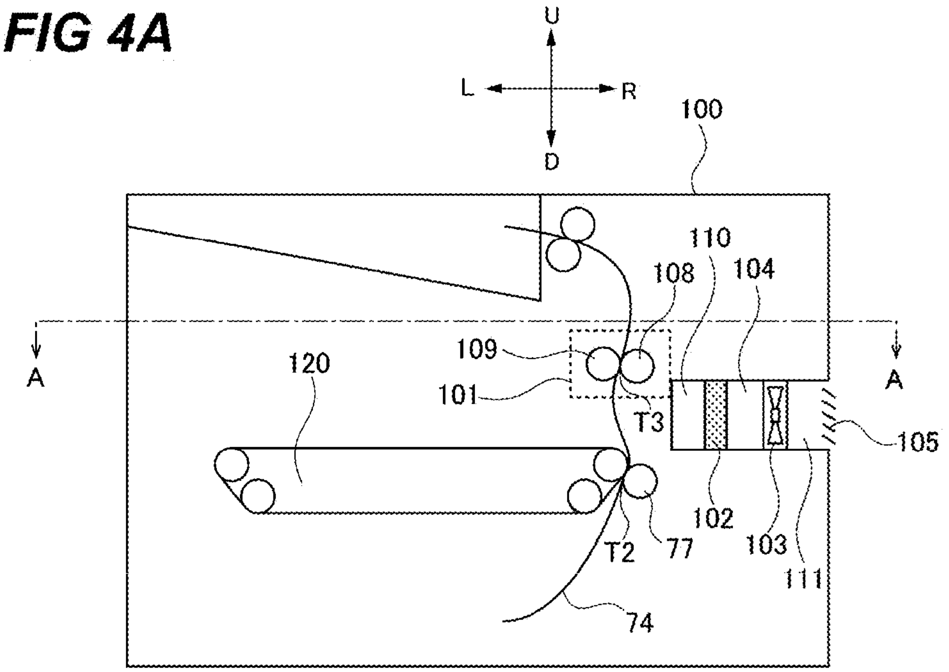
FIGS. 4A and 4B are diagrams showing cross-sectional views of an arrangement of an exhaust duct and a filter.
Figure 4B:
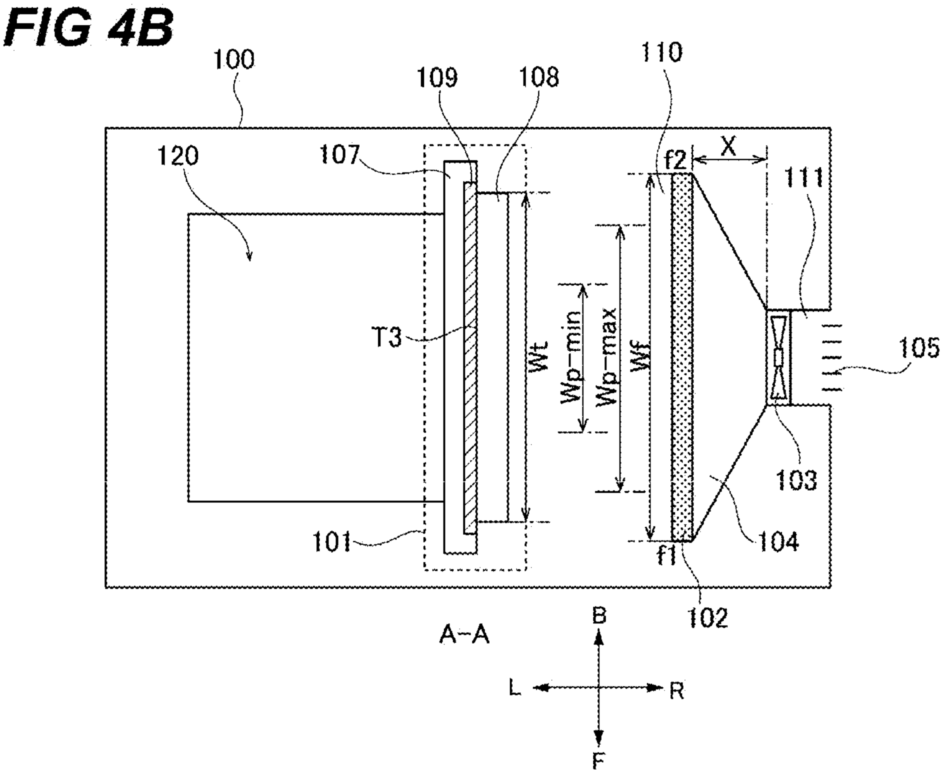

The longitudinal directions of the fixing nip portion T3 coincide with the widthwise directions perpendicular to the conveying direction of the recording material S, and with the forward and backward directions as shown in FIG. 4B.

<Structure for Reduction of UFP>

Generally, the filter 102 disposed in the image forming apparatus is used for collecting UFP in the air to reduce the amount of UFP exhausted outside the image forming apparatus.

The image forming apparatus 100 according to the present embodiment is provided with the duct 104, the fan 103 and the filter 102 and these components will be described in the following with reference to FIGS. 2, 3 and 4.

Figure 2:
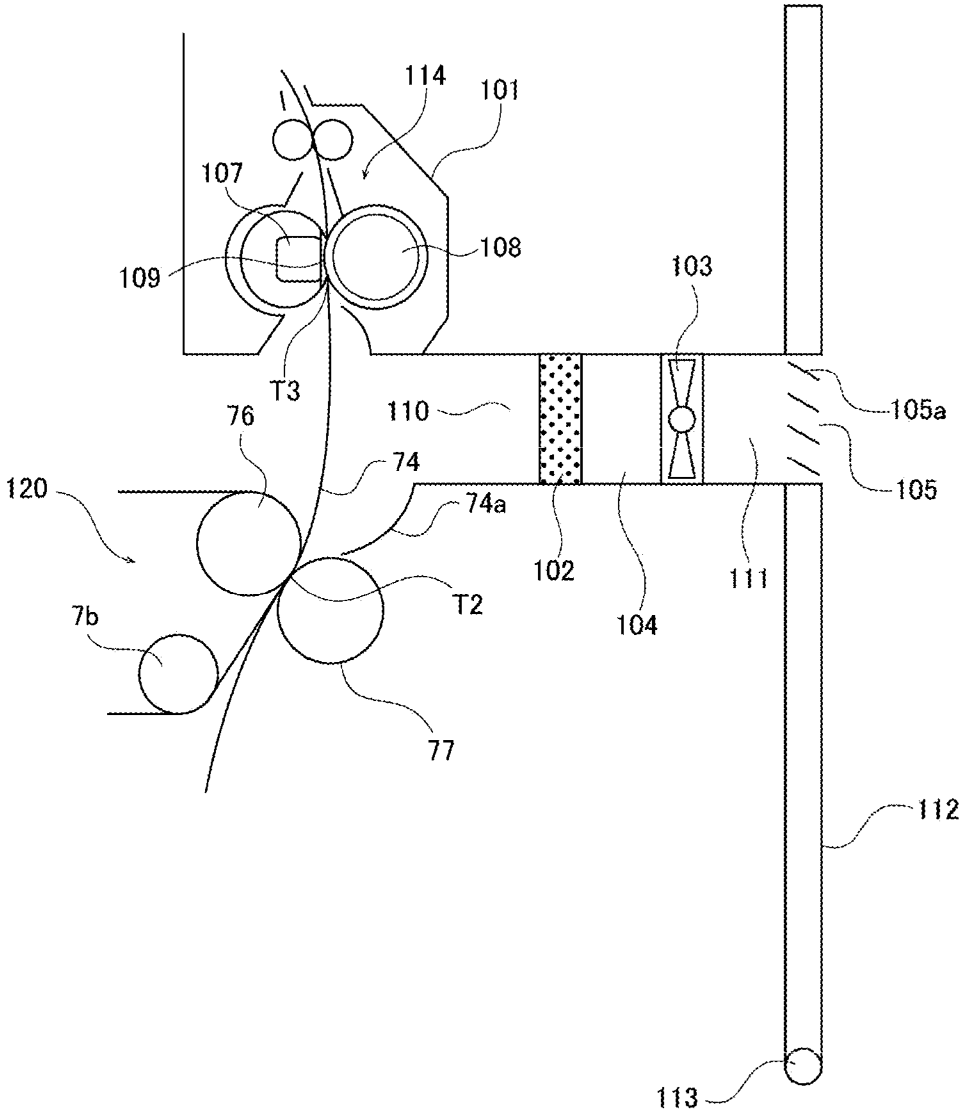
FIG. 2 is a diagram showing a cross-sectional view of the vicinity of a fixing portion of the image forming apparatus.
Figure 3:
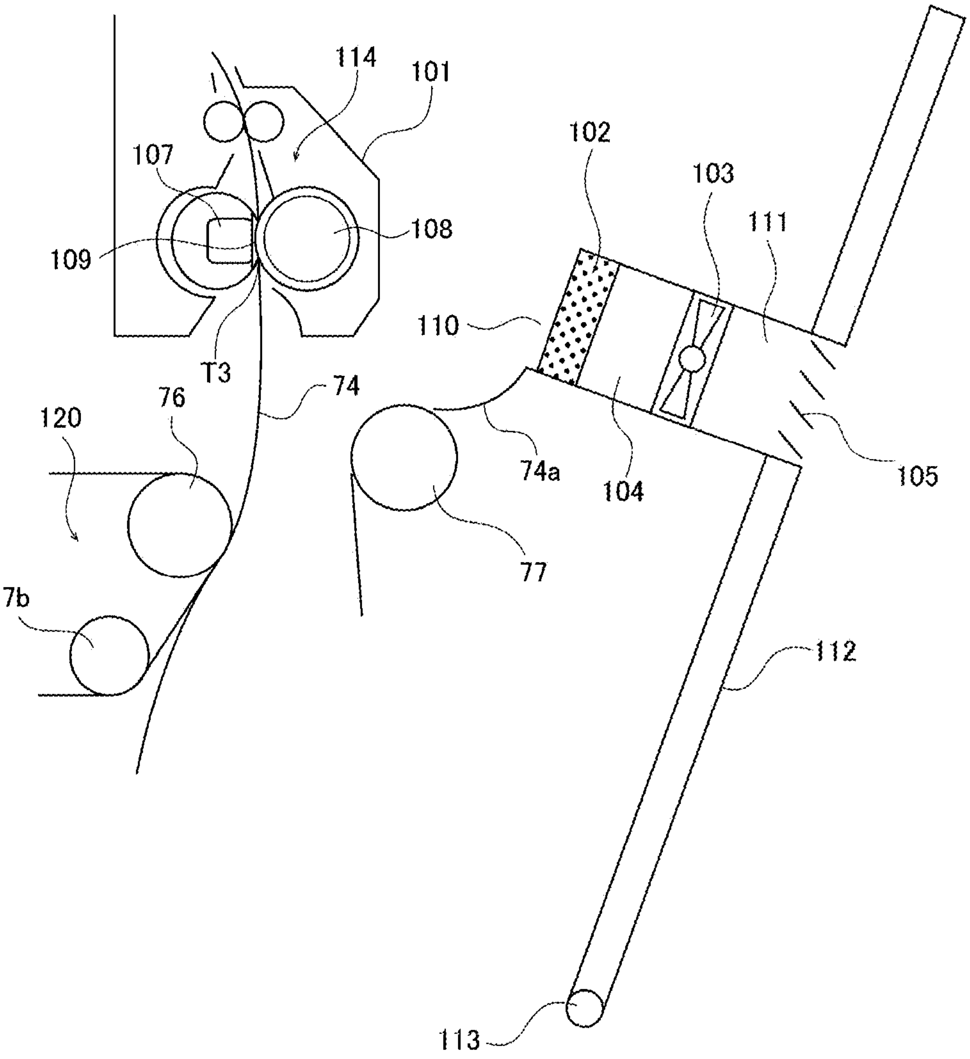
FIG. 3 is a diagram showing a cross-sectional view of the vicinity of a fixing portion of the image forming apparatus.

FIG. 2 is a diagram showing a cross-sectional view illustrating the disposition of the filter, the duct and the fan in the vicinity of the fixing portion in the state where the door is closed. FIG. 3 is a diagram showing a cross-sectional view illustrating the disposition of the filter, the duct and the fan in the vicinity of the fixing portion in the state where the door is opened. FIG. 4A is a schematic diagram showing a cross-sectional view of the image forming apparatus for illustrating the disposition of the filter, the duct and the fan. FIG. 4B is a diagram showing an A-A cross-sectional view of FIG. 4A.

<Structure of Duct>

The duct 104 is provided with the intake inlet 110 that takes in air, and the exhaust outlet 111 that exhausts the air taken in from the intake inlet 110 outside the image forming apparatus 100. The duct 104 forms a closed space for the air flow travelling from the intake inlet 110 to the exhaust outlet 111.

The duct 104 is located between the fixing portion 101 and the apparatus side surface 115 on which the door 112 for opening the conveying path 74 is provided. The door 112 is provided such that the door 112 is rotatable around the hinge portion 113 with respect to the image forming apparatus 100. The duct 104 is provided on the door 112. In this way, the duct 104 forming a path for exhausting air is provided between the fixing portion 101 and the door 112 for opening the conveying path 74, enabling the fine particles such as steam and UFP produced in the fixing portion 101 to be efficiently exhausted outside the apparatus for the shortest path.

The fan 103 is provided inside the duct 104. The fan 103 generates an air flow travelling from the intake inlet 110 to the exhaust outlet 111. In this embodiment, the configuration is exemplified in which the fan 103 is provided inside the duct 104 between the intake inlet 110 and the exhaust outlet 111, however, the invention is not limited to this disposition.

The intake inlet 110 of the duct 104 is an opening disposed between the fixing nip portion T3 and the transfer nip portion T2, and the opening faces the side on which the fixing nip portion T3 is located. The exhaust outlet 111 of the duct 104 is connected to the louver 105 provided on the door 112 on the apparatus side surface 115. The louver 105 includes a plurality of the long plate-like members 105*a*. Each of the plurality of the long plate-like members 105*a* extends in the directions (forward and backward directions) perpendicular to the drawing surface of FIG. 1 as the longitudinal direction. The long plate-like members 105*a* are provided being distant from each other in parallel along the vertical directions such that the longitudinal directions of the long plate-like members 105*a* are the same as each other. As illustrated in FIG. 2, the long plate-like members 105*a* are disposed in a direction in which air flows towards the side on which the lower part of the apparatus is located. The fan 103 generates an air flow from the intake inlet 110 to the exhaust outlet 111, so that the air around the fixing nip portion T3 is forcibly exhausted outside the apparatus.

The side of the duct 104 on which the exhaust outlet 111 is located is connected to the door 112, so that the duct 104 is integrally provided with the door 112. The door 112 is configured to be openable and closable such that the door 112 takes a closed position (indicated in FIG. 2) in which the conveying path 74 is covered by the door 112 and an opened position (indicated in FIG. 3) in which the conveying path 74 is opened. As indicated in FIG. 3, when the door 112 is opened, the duct 104 is relocated from within the apparatus to the exterior of the apparatus in conjunction with the door 112. In this case, the duct 104 is opened to the exterior of the apparatus from the side on which the intake inlet 110 is located. As a result, the filter 102, which will be described later, is exposed from the side of the duct 104 on which the intake inlet 110 is located. Namely, when the door 112 is located in the opened position, the filter 102 is exposed. The filter 102 is provided in the image forming apparatus 100 in a detachably attachable manner. Therefore, when the door 112 is opened, the filter 102 can be easily exchanged.

The duct 104 is disposed between the secondary transfer portion T2, which is a transfer nip portion, and the fixing portion T3 in the vertical directions of the image forming apparatus 100. The intake inlet 110 of the duct 104 is disposed between the fixing nip portion T3 of the pair of rotating members 114 and the secondary transfer portion T2 as a transfer nip portion. More specifically, the intake inlet 110 of the duct 104 is disposed close to the upstream side of the fixing nip portion T3 in the conveying direction of the recording material S. With this configuration, the fine particles included in the air can be collected at the upstream side of the fixing nip portion T3 where UFP is considered to be generated most by the heat during the fixing process.

The guide member 74*a* forms the conveying path 74 in the vertical directions between the secondary transfer portion T2 and the fixing nip portion T3. The guide member 74*a* is connected to the side of the duct 104 on which the intake inlet 110 is located and is provided integrally with the door 112. Therefore, as illustrated in FIG. 3, when the door 112 is opened, the guide member 74*a* is relocated from inside the apparatus towards the exterior of the apparatus in conjunction with the door 112 and the conveying path 74 is opened. With this configuration, the jam recovery for the recording material in the conveying path 74 can be easily performed and the above described filter 102 can be easily exchanged.

<Configuration of Filter>

The filter 102 is provided in the duct 104 and has the aeration resistance larger than that in the inside of the duct 104. The filter 102 filtrates UFP from the air passing through the filter 102. The filter 102 also functions as a collecting member that collects the fine particles such as steam and UFP included in the passing air.

When collecting UFP resulting from the wax (release agent) included in toner, it is desirable that filter 102 is made from the electrostatic unwoven fabrics. The electrostatic unwoven fabrics are made by creating a static charge on the fibers of the unwoven fabrics. The electrostatic unwoven fabrics can efficiently collect (filtrate) UFP. The higher the density of the fibers is, the higher the collecting (filtrating) performance is, however, the larger the pressure loss is likely to become. This relationship also applies to the case where the thickness of the electrostatic unwoven fabrics is increased. Further, when the charging strength of the fibers (strength of static charge) is increased, the filtration performance can improve with the pressure loss being constant. It is desirable to set as appropriate the thickness of the electrostatic unwoven fabrics, the density of the fibers, and the charging strength of the fibers in response to the filtration performance required for the filter 102. The density of the fibers, the thickness, and the charging strength for the electrostatic unwoven fabrics used in the filter 102 of the present embodiment are set such that the aeration resistance is about 40 [Pa] and the collecting rate is 95 [%] when the passing air flow speed is 10 [cm/s].

The filter 102 is disposed between the intake inlet 110 of the duct 104 and the fan 103. The filter 102 is disposed such that the filter 102 covers the entire region of the closed space in the duct 104 along the length of the fixing nip portion T3 in the longitudinal direction.

In the present embodiment, the filter 102 is disposed on the intake inlet 110. The filter 102 is provided such that the filter 102 covers the entire region of the intake inlet 110 provided along the length of the fixing nip portion T3 in the longitudinal direction.

Taking the collecting efficiency of UFP into consideration, it is desirable that the filter 102 is located as close as possible to the fixing nip portion T3. In particular, it is desirable that the filter 102 is disposed on the upstream side of the fixing nip portion T3 where the UFP is produced most. However, when the filter 102 is located too close to the fixing nip portion T3, the filter 102 may be thermally deteriorated due to the heat produced by the radiation from the heater 109 of the fixing portion 101, so that the filtrating performance may be lowered. Therefore, it is desirable that the filter 102 is located at an appropriate distance from the fixing nip portion T3. Specifically, it is desirable that the shortest distance between the filter 102 and the fixing nip portion T3 is equal to or larger than 5 [mm]. In another point of view, it is desirable that the filter 102 is disposed within 100 [mm] from the fixing nip portion T3 in order to surely collect UFP. Therefore, it is desirable that the shortest distance between the filter 102 and the heater 109 is equal to or larger than 5 [mm] and equal to or smaller than 100 [mm]. Namely, it is desirable that the shortest distance between the filter 102 and the fixing nip portion T3 is equal to or larger than 5 [mm] and equal to or smaller than 100 [mm].

The intake inlet 110 of the duct 104 is provided so as to extend until the outside regions of the both end portions of the recording material S that has the largest size that can be used for the image forming apparatus 100 in the longitudinal direction of the fixing nip portion T3. The filter 102, which covers the entire region of the intake inlet 110, is therefore disposed to extend in the longitudinal direction of the fixing portion 101 as shown in FIG. 4B.

Specifically, likewise the intake inlet 110, the filter 102 is provided so as to extend until the outside regions of the both end portions of the recording material S that has the largest size that can be used for the image forming apparatus 100 in the longitudinal direction of the fixing nip portion T3.

In the fixing portion 101 according to the present embodiment, the recording material S is positioned and conveyed with reference to the center of the widthwise direction perpendicular to the rotational moving direction of the belt 107. Therefore, in the region (width Wp_Max) for the recording material S has the largest size that can be used for the image forming apparatus 100, UFP is easily produced irrespective of the width size of the recording material S. Therefore, it is preferable to surely collect UFP at least in this region. Therefore, the width Wf of the filter 102 in the longitudinal direction is equal to or greater than the width Wp_Min of the smallest recording material S. Further, UFP can be produced in the region (width Wp_Max) of the largest size that can be used for the image forming apparatus 100. Therefore, it is desirable that UFP is collected in the entire region in order to surely collect UFP. Therefore, it is desirable that the width Wf of the filter 102 in the longitudinal direction is equal to or greater than the width Wp_Max of the largest size of the recording material S (equal to or greater than the greatest width).

In the present embodiment, the largest size of the usable recording material is the A3 size, whereas the smallest size of the usable recording material is the postcard size. The width of the recording material S in the direction perpendicular to the conveying direction is 297 [mm] and 100 [mm] in the cases of the A3 size and the postcard size, respectively.

Therefore, the width Wf (intake inlet 110) of the filter 102 in the longitudinal direction is equal to or greater than the width Wp_Min of the recording material S having the smallest size and is equal to or greater than the width Wp_Max of the recording material S having the largest size (Wp_Min<Wp_Max<Wf).

Further, both end portions of the filter 102 in the longitudinal direction are provided in the region outside the both end portions of the width W of the fixing nip portion T3 in the longitudinal direction. Namely, the width Wf (intake inlet 110) of the filter 102 in the longitudinal direction is equal to or greater than the width Wp_Min of the recording material S having the smallest size, is equal to or greater than the width Wp_Max of the recording material S having the largest size, and is equal to or greater than the width Wt of the fixing nip portion T3 in the longitudinal direction (Wp_Min<Wp_Max<Wt<Wf).

The positional relationship between the width Wf (intake inlet 110) of the filter 102 in the longitudinal direction, the width Wp_Min of the recording material S having the smallest size, the width Wp_Max of the recording material S having the largest size, and the width Wt of the fixing nip portion T3 in the longitudinal direction are shown in FIG. 4B. Namely, the width Wf (intake inlet 110) of the filter 102 in the longitudinal direction, the width Wp_Min of the recording material S having the smallest size, the width Wp_Max of the recording material S having the largest size, and the width Wt of the fixing nip portion T3 in the longitudinal direction overlap with each other in the longitudinal direction of the fixing nip portion T3.

The filter 102 is detachably attachable to the image forming apparatus 100. In the present embodiment, the filter 102 is attached to the duct 104 in a detachable manner. As described above, the duct 104 is provided integrally with the door 112 which rotates about the hinge portion 113. Further, an attaching frame for attaching the filter 102 is disposed on the intake inlet 110 of the duct 104. After the filter 102 is attached to the attaching frame, the filter 102 is secured by pinching the filter between the attaching frame and the securing frame. Therefore, when the door 112 is opened, the duct 104 and the guide member 74*a* are relocated towards the exterior of the apparatus in conjunction with the door 112. As a result, the filter 102 is exposed from the side on which the intake inlet 110 is located, so that the exchanging work can be easily performed.

<Uniformity of Aeration at Filter Portion>

As described above, the filter 102 is disposed on the intake inlet 110 provided along the length of the fixing nip portion T3 in the longitudinal direction to cover the entire region of the intake inlet 110. The filter 102 has the aeration resistance greater than that of the inside of the duct 104. In this case, the intake can be uniformly performed in the longitude direction of the intake inlet 110.

As described above, the filter 102 with fine grain of fibers for collecting UFP has the property of suppressing the air passing. When the exhaustion by the fan 103 is performed in the state where the air passing is suppressed by the filter 102, the space between the filter 102 and the fan 103 becomes in the state of negative pressure. In the state of negative pressure in the space between the fan 103 and the filter 102, suction force is uniformly applied to the entire region of the filter 102 in the longitudinal direction, so that the air passes uniformly through the entire region of the filter 102. Namely, the entire region of the back surface region of the filter 102 can be maintained at a constant negative pressure by disposing the filter 102, which is an aeration resistance, on the intake inlet 110.

<Confirmation of Aeration Amount Distribution at Intake Inlet>

The aeration amount distribution at the intake inlet according to the present embodiment will be described by way of comparison with a reference example with reference to FIGS. 5 to 7.

Figure 5:
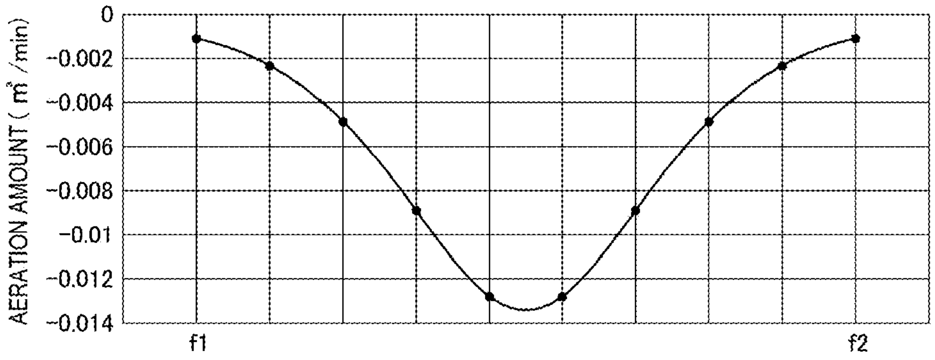
FIG. 5 is a diagram showing a distribution of the amount of passing air at an intake inlet of a reference example.

FIG. 5 is a graph showing the aeration amount distribution at the intake inlet according to the reference example. FIG. 6 is a graph showing the aeration amount distribution at the intake inlet (filter) according to the present embodiment. FIG. 7 is a graph showing the aeration amount distribution at the intake inlet (filter) while the spatial distance between the filter and the fan is changed in the present embodiment.

In the configuration of the reference example, the fan is disposed at the side of the duct on which the intake inlet is located and the filter is disposed at the side of the duct on which the exhaust outlet is located. FIG. 5 shows the aeration amount distribution of the reference example in the longitudinal direction of the intake inlet. Namely, in the reference example, the filter is disposed between the exhaust outlet and the fan inside the duct.

In contrast, in the present embodiment, the filter is disposed at the side of the duct on which the intake inlet is located and the fan is disposed at the side of the duct on which the exhaust outlet is located. FIG. 6 shows the aeration amount distribution of the present embodiment in the longitudinal direction of the intake inlet. Namely, in the present embodiment, the filter is disposed between the intake inlet and the fan inside the duct.

Figure 6:
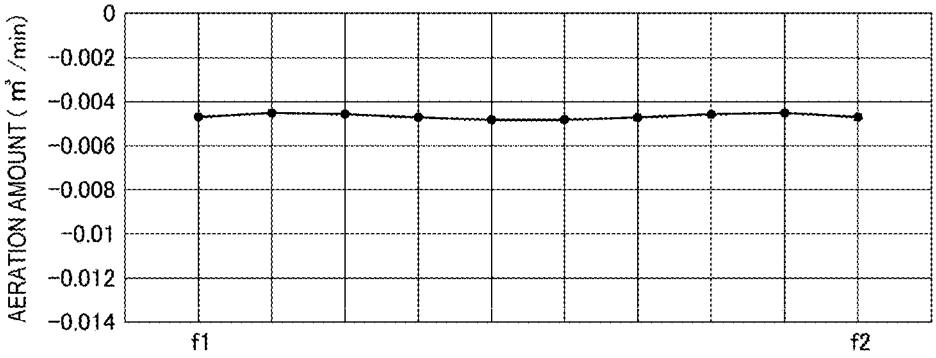
FIG. 6 is a diagram showing a distribution of the amount of passing air at an intake inlet (filter) of an embodiment of an embodiment of the present invention.

In FIGS. 5 and 6, the vertical axis represents the aeration amount and the horizontal axis represents the position of the filter in the longitudinal direction. The reference characters "B" and "C" respectively represent the positions of the end portions f1 and f2 of the filter 102 (intake inlet 110) shown in FIG. 4B in the longitudinal direction. In the figures, the aeration amount discharged outside the apparatus is represented as negative value.

The fan 103 is an axial fan with 60 [mm] square having the predetermined PQ characteristics (P represents static pressure [Pa], Q represents air amount [$m^3$/min]). The rated voltage is 24 [V] and the rated number of revolution is 5300 [rpm]. The height of the intake inlet is 60 [mm], which is the same as that of the fan 103. Taking into consideration the width of the recording material of the largest size, the width of the intake inlet in the longitudinal direction is set to 300

[mm]. In the present embodiment, the filter 102 of the same size as that of the intake inlet is disposed on the intake inlet. As an example, the spatial distance between the intake inlet 110 and the fan 103 is 50 [mm]. Further, the fan 103 is disposed in the position corresponding to the center of the intake inlet 110 in the longitudinal direction.

In the configuration of the reference example, the filter 102 is disposed on the exhaust outlet 111. With this configuration, as shown in FIG. 5, the air is exhausted at the end portions f1 and f2 of the intake inlet 110, which are distant from the fan 103, only about 10 percent as compared with the central portion in the region between the end portions f1 and f2. It shows that there exits significant unevenness of aeration amount across the longitudinal direction.

In contrast, in the configuration of the present embodiment, the filter 102 is disposed on the intake inlet 110. With this configuration, as shown in FIG. 6, the air is exhausted at the end portions f1 and f2 of the intake inlet 110, which are distant from the fan 103, about 90 percent as compared with the central portion in the region between the end portions f1 and f2. It shows that unevenness of aeration amount is significantly improved across the longitudinal direction.

Figure 7:
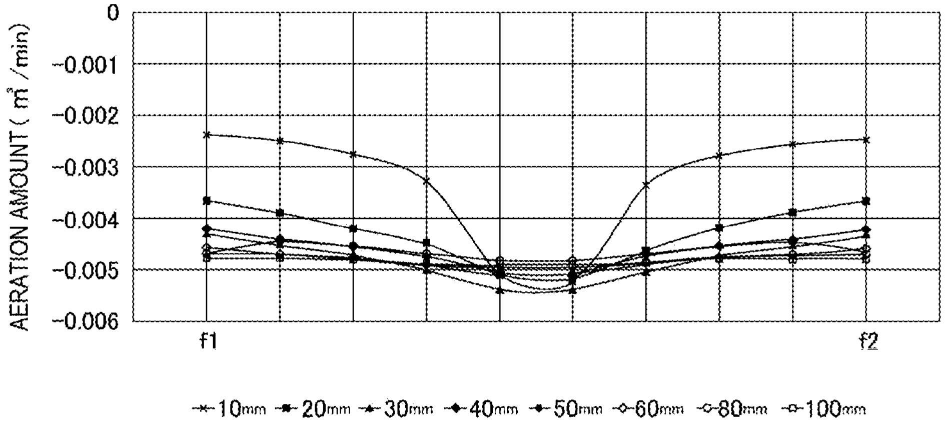
FIG. 7 is a diagram showing a distribution of the amount of passing air at the intake inlet (filter) of the embodiment when changing a spatial distance between the filter and the fan.

FIG. 7 is a diagram showing the aeration amount distribution in the case of changing the spatial distance X [mm] between the filter 102 and the fan 103 (see FIG. 4B). The minimum spatial distance Xmin is 10 [mm] and the maximum spatial distance Xmax is 250 [mm]. When the filter 102 is provided too close to the fan 103, the filter 102 is sucked to the fan 103, so that the filter 102 functions as a resistance, leading to a significant reduction in the exhaust efficiency of the fan 103. Therefore, it is desirable that the filter 102 is disposed to be away from the fan 103 for an appropriate distance.

Specifically, it is desirable for the spatial distance X between the filter 102 and the fan 103 to be equal to 10 [mm] or greater. Whereas when the filter is too distant from the fan, the duct itself has a high flow resistance, which decreases the exhaust performance. Therefore, it is desirable that the filter is disposed at an appropriate distance from the fan. Specifically, it is desirable that the spatial distance X between the filter 102 and the fan 103 is equal to 100 [mm] or less.

As shown in FIG. 7, when the spatial distance X is 10 [mm], the air is exhausted at the end portions about 50 percent as compared with the central portion where the exhausted air amount is set to 100 percent. When the spatial distance X is 20 [mm], 30 [mm], and 40 [mm], the air is exhausted at the end portions about 70 percent, 80 percent, and 85 percent, respectively. In the case where the spatial distance X is equal to 50 [mm] or greater, even when the spatial distance X is equal to 100 [mm], the air is exhausted 90 percent or greater at the end portions. It is understood that the greater the spatial distance X is, the more the unevenness of the aeration amount can be improved across the longitudinal direction. This is because the space of negative pressure between the filter 102 and the fan 103 that is required for effecting the suction pressure evenly on the entire region of the filter 102 can be more easily kept when the spatial distance X becomes greater.

As describe above, according to the present embodiment, by disposing the filter 102 having the aeration resistance greater than that of the duct 104 at the intake inlet 110 as a duct inlet, the aeration is suppressed. When the air is exhausted by the fan 103 in this state, the space between the filter 102 and the fan 103 becomes the state of the negative pressure, so that the suction pressure works evenly on the entire region of the filter. As a result, the air flows through the entire region of the filter 102 without unevenness. With this configuration, the fine particles included in the air passing through the filter 102 can be collected across the longitudinal direction of the fixing nip portion T3 without unevenness.

Further, this configuration prevents the intake pressure from becoming locally strong and suppresses the image unevenness caused by the locally low temperature of the belt 107.

Furthermore, the filter 102 is disposed upstream of the fixing nip portion T3 where UFP is produced most, and the entire region of the intake inlet 110 provided across the length of the fixing nip portion T3 in the longitudinal direction is covered by the filter 102. With this configuration, the air is taken in at the entire region of the filter 102 and UFP is collected very efficiently.

<Modifications>

Further, in the above-described embodiment, the electrostatic unwoven fabrics are exemplified as the filter 102 (collecting member, filtrating member), which collects the fine particles such as steam and UFP included in the passing air. However, the filter 102 is not limited to electrostatic unwoven fabrics. Another filter such as honeycomb filter can be used instead of the electrostatic unwoven fabrics.

Furthermore, in the above-described embodiment, the filter 102 is exemplified as to be disposed on the intake inlet 110. However, the disposing position of the filter 102 is not limited to this configuration. The filter 102 may be disposed between the intake inlet 110 and the fan 103 in the duct 104 as to be closer to the fan 103 than the intake inlet 110 by a certain distance.

Moreover, in the above-described embodiment, an endless belt is used for the heating rotating member (first rotating member) for heating a toner image. However, the heating rotating member is not limited to an endless belt. For example, the heating rotating member may be a roller or a belt unit wound around rollers. However, the present invention becomes more effective for the heating rotating member in the above-described embodiment, whose surface becomes of a high temperature to be easier to produce UFP.

Additionally, in the above-described embodiment, the door 112 for opening the conveying path 74 is disposed on the right side surface side of the image forming apparatus. However, the present invention is not limited to this configuration and the door 112 may be disposed on the left side surface side of the image forming apparatus, by reversing the right and left sides.

Further, in the above-described embodiment, the duct 104 is exemplified as being configured integrally with the door 112 on the apparatus side surface 115 for opening the conveying path 74. However, the invention is not limited to this configuration. For example, the duct 104 may be provided integrally with the types of an opening and closing member such as a type in which a hinge portion is provided at the backside of the apparatus and an opening and closing member may be opened or closed by the rotation in the forward and backward directions and a type in which an opening and closing member can be drawn out by sliding movement in the right and left directions or the forward and backward directions.

In addition, in the above-described embodiment, the duct 104 is exemplified as being linearly configured as shown in FIG. 2. However, the duct 104 may be non-linearly configured.

Furthermore, in the above-described embodiment, the plate-like members 105*a* of the louver 105 connected to the exhaust outlet 111 of the duct 104 is exemplified as being disposed in the direction in which the air flows downwardly of the apparatus. However, the invention is not limited to this configuration. For example, the plate-like members 105*a* of the louver 105 may be configured as being disposed in the direction in which the air flows backwardly of the apparatus.

Moreover, in the above-described embodiment, a printer is exemplified as an image forming apparatus. However, the present invention is not limited to this configuration and the image forming apparatus may be another one such as a copying machine, facsimile and multifunctional apparatus combining the functions of these. In the above-described embodiment, an image forming apparatus is exemplified as being configured to have an intermediate transfer member, to transfer toner images of respective colors onto the intermediate transfer member in a sequentially superimposing manner, and to transfer in a batch the toner images on the intermediate transfer member onto a recording material. However, the invention is not limited to this configuration. The image forming apparatus may be configured to have a recoding material bearing member and to transfer in a sequentially superimposing manner the toner images of respective colors onto the recording material borne by the recording material bearing member. By applying the present invention to these configurations, the similar effect can be obtained.

Additionally, in the above-described embodiment, a recording system is exemplified as being the electrophotographic system. However, the present invention is not limited to this configuration. For example, the image forming apparatus may be one with another recording system such as an ink-jet type. Although the image forming apparatus of an ink-jet type does not have a fixing portion for applying heat and pressure, such apparatus has a drying unit for drying the recording material bearing an image, which has the same problem of exhausting heat and air as the one with the electrophotographic system in common. Therefore, when the present invention is applied to the ink-jet type image forming apparatus, the similar effect of the above-described embodiment can be expected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-19187, filed Feb. 13, 2024, which is hereby incorporated by reference herein in its entirety.

What is claimed is:

1. An image forming apparatus for forming an image on a recording material, comprising:

a transfer portion configured to form a toner image on the recording material using toner containing release agent;

a fixing portion configured to fix the toner image formed on the recording material by the transfer portion by nipping and conveying the recording material at a fixing nip portion formed with a pair of rotating members;

a door configured to open a conveying path between the transfer portion and the fixing portion, the door being opposed to a surface of the recording material traveling through the conveying path;

a duct provided on the door, the duct having an intake inlet for taking in air and an exhaust outlet for exhausting the air taken in from the intake inlet outside the image forming apparatus, the duct forming a closed space for an air flow travelling from the intake inlet to the exhaust outlet;

a fan provided inside the duct, the fan being configured to generate the air flow travelling from the intake inlet to the exhaust outlet; and a filter provided detachably attachable to the duct, the filter being configured to collect particles with a predetermined particle diameter that are caused by the release agent, wherein the filter has a width that is equal to or greater than a recording material with a maximum width passing through the fixing nip portion in a widthwise direction perpendicular to a conveying direction of the recording material.

2. The image forming apparatus according to claim 1, wherein the intake inlet of the duct has a width equal to or greater than the maximum width of the recording material passing through the fixing nip portion in the widthwise direction.

3. The image forming apparatus according to claim 2, wherein the filter is provided on the intake inlet.

4. The image forming apparatus according to claim 3, wherein the door is configured to be openable and closable such that the door is in a closed position in which the conveying path is covered by the door and an opened position in which the conveying path is opened by the door, and wherein when the door is in the opened position, the filter is exposed.

5. The image forming apparatus according to claim 1, wherein the intake inlet is provided between the fixing nip portion and the transfer portion.

6. The image forming apparatus according to claim 1, wherein the filter is a collecting member configured to collect fine particles included in the air passing the filter.

7. The image forming apparatus according to claim 1, wherein a spatial distance between the filter and the fan inside the duct is equal to 10 [mm] or greater and equal to 100 [mm] or less.

8. The image forming apparatus according to claim 1, wherein the shortest distance between the filter and the fixing nip portion is equal to 5 [mm] or greater and equal to 100 [mm] or less.

9. The image forming apparatus according to claim 1, wherein the pair of the rotating members of the fixing portion includes:

a first rotating member configured to heat the recording material bearing an image; and a second rotating member forming a fixing nip portion by abutting on the first rotating member.

10. The image forming apparatus according to claim 9, wherein the first rotating member is an endless belt.

* * * * *